US007194435B1

(12) United States Patent
Sforzo

(10) Patent No.: US 7,194,435 B1
(45) Date of Patent: Mar. 20, 2007

(54) COMPUTERIZED METHOD, APPARATUS AND SYSTEM FOR ISSUING SURETY BONDS

(76) Inventor: Joseph Sforzo, 522 Broadway, Massapequa, NY (US) 11758

( * ) Notice: Subject to any disclaimer, the term of this patent is extended or adjusted under 35 U.S.C. 154(b) by 404 days.

(21) Appl. No.: 09/694,776

(22) Filed: Oct. 23, 2000

Related U.S. Application Data

(60) Provisional application No. 60/161,212, filed on Oct. 22, 1999.

(51) Int. Cl.
*G06Q 40/00* (2006.01)
(52) U.S. Cl. .......................................... 705/37; 705/35
(58) Field of Classification Search ................. 705/38, 705/35
See application file for complete search history.

(56) References Cited

U.S. PATENT DOCUMENTS

| 4,567,359 A * | 1/1986 | Lockwood ................... 235/381 |
| 5,655,085 A * | 8/1997 | Ryan et al. ..................... 705/4 |
| 5,987,434 A * | 11/1999 | Libman ......................... 705/36 |
| 6,009,402 A * | 12/1999 | Whitworth ...................... 705/4 |
| 6,347,302 B1 * | 2/2002 | Joao .............................. 705/4 |
| 2002/0026334 A1 * | 2/2002 | Igoe .............................. 705/4 |

OTHER PUBLICATIONS

SIO Special Bulletin downloaded from archieved web site at http://web.archive.org/web/19990209155/http://www.connectyou.com/sio/, Feb.1999.*

Major Upgrade Announced for Surety Software, News Release, p. 1, Apr. 23, 1993.*
Schroeder, Stephanie; Risk Management v46n6 Jun. 1999.*
Relience Group Providing On-line Access to Worker's Comp, Auto Surety, Professional Liablity Coverages..Dec. 1998.*
Brokering cyberspace Dory Devlin. Best's Review. (Property/casualty insurance edition). Oldwick: Jul. 1998. vol. 99, Iss. 3; p. 99, 3 pgs.*
Wulff (Building credibility with contractors and sureties), American Agent and Broker v68n7 pp. 24-27 Jul. 1996.*

* cited by examiner

*Primary Examiner*—Jagdish N Patel
(74) *Attorney, Agent, or Firm*—Thomas A. O'Rourke; Bodner & O'Rourke, LLP

(57) ABSTRACT

A method, system and apparatus for obtaining a bond is disclosed. The invention employs a computer system that has a work station in communication with a server to provide information on a contractor that is required by a surety over the computer system. The server is provided with owner/obligee information concerning a bond over the network A surety is selected to provide the bond and the identity of the surety is presented over said computer network. The type of bond sought is identified. Approval of the bond is requested over the computer network and a decision on the bond request is obtained over the network. The approval decision includes an authorization code that is presented at a bid letting along with the contractor's bid. The authorization code permits an owner/obligee to view an approved bond through the computer network.

41 Claims, 45 Drawing Sheets

SURETY 2000
BID BOND MANAGER
Bid Bond Approval System Version 1.0

- Login
- Introduction
- Jobs
- News
- Documentation
- FAQ
- Help

→ Enter your login information and push the Login button.
You must have a valid user name and password to access the system!

User Name: `insurance`   Password: `****`   [Login]

Authorized access only!
Do NOT give your user information to ANYONE!

©1997 AAWS Web Services

This is the login page. In order to use Surety2000 you must receive a user name and password from Surety2000. At least one participating surety must authorize you first. Then Surety2000 will give you the necessary user and password.

For purposes of this presentation we will use the user name "insurance" and password "john" After the user name and password are inserted you will click on "login".

FIGURE 1C

SURETY 2000
BID BOND MANAGER
*Bid Bond Approval System Version 1.0*

Insurance Agency
John Doe

3/2/99

- Agency Main Menu:

| Login |
| Main Menu |
| Contractors |
| Employees |
| FAQ |
| Documentation |
| Help |

| New Bond | Search Bonds | Approved Bonds 180+ | Pending Bonds | Dead Bonds |

Search Approved Bonds By:

Owner/Obligee [_____] Search

Contractor [_____] Search

Bond Number [_____] Search

©1997 AAWS Web Services

This is the main menu. The system has identified the user and the date. From here you can navigate to any part of the system. Look across the horizontal bar. You can enter a new bond, search for an approved bid bond, search for an approved bid bond that is over 180 days old, search for a pending bond, or search for a dead bond.

Let's start by searching for all pending bid bonds. A pending bid bond is a bid bond that has been entered into the system but, is waiting to be approved.

Click on "pending bonds" on the horizontal bar.

FIGURE 2

![Surety 2000 Bid Bond Manager screen]

SURETY 2000
BID BOND MANAGER
*Bid Bond Approval System Version 1.0*

Insurance Agency
John Doe

3/1/99

Agency Pending Bonds Search

| Login | New Bond | Search Bonds | Approved Bonds 180+ | Pending Bonds | Dead Bonds |

Main Menu

Contractors

Employees

FAQ

Documentation

Help

Search Pending Bonds by:

Owner/Obligee [                    ]  Search

Contractor [ blank for universal search- ]  Search

©1997 AAWS Web Services

You will see that the "Pending Bond" section in the horizontal bar is highlighted. You may enter the name of a contractor or owner/obligee and do a specific search. Let's search for all of your pending bonds. (remember that the system knows who you are what bonds you are authorized to view)

To search for all pending bid bonds simply leave the fields blank and click on the "search box" next to the contractor field.

FIGURE 3

This is a very valuable tool for the surety agent. As each bid bond is entered into the system for your agency, the bid bond will be listed here in chronological order of bid date. This screen can be used as a daily work list of bid bonds to be approved. The appropriate surety company can see the pending bid bond and accept it as the bid bond request. To the right of the screen is "edit" and "view". (sorry, the printer cannot print items that you must scroll to the right to see on a monitor.)

Let's click edit. (remember, you cannot see "edit" here but, you will be able to see it on your monitor).

FIGURE 4

SURETY 2000
BID BOND MANAGER
*Bid Bond Approval System Version 1.0*

Insurance Agency
John Doe
3/2/99

- Login
- Main Menu
- Contractors
- Employees
- FAQ
- Documentation
- Help

Edit Bond:

Contractor Information:
- Contractor: ABC CONTRACTING, INC.
- Address: 100 SMITH STREET
- City: ANYWHERE
- State: New York
- Zip Code: 1111111

Owner/Job Information:
- Owner/Obligee: City of New York Department of Design and Construction
- Bid Bond Form: AIA Document A310
- Address:
- City: Long Island City
- State: New York
- Zipcode: 10031
- Bid Date: 2 / 21 / 1999
- Estimated Contract Price: optional
- Amount of Bid Security: ten percent of bid amount
- Contract # or IFB#: 456123
- Description of Job: description of project here.

Still Pending    Approved    Dead

©1997 AAWS Web Services

This is a pending bid bond. It is a review of the information as it will appear when it is approved. You can change the bid date, estimated contract price, amount of bid bond, ifb number and the description of the job. Then you can return it into the pending list, approve the bid bond, or send it into the dead file where it cannot return.

FIGURE 5

SURETY 2000
BID BOND MANAGER
Bid Bond Approval System Version 1.0

Insurance Agency
John Doe

3/1/99

▶Enter New Bid Bond Step 1 of 4

- Login
- Main Menu
- Contractors
- Employees
- FAQ
- Documentation
- Help

Contractor Information:
- Company Name: abc        Next >
- Address:
- City:
- State:
- Zip Code:

Owner/Obligee/Job Information:
- Owner/Obligee:
- Bid Bond Form:
- Address:
- City:
- State:
- Zip Code:
- Bid Date:
- Estimated Contract Price:
- Amount of Bid Security:
- Contract # or IFB#:

Description of Job:

Bid Bond Status: Approved Pending

Reset

©1997 AAWS Web Services

This is the screen after you click on "new bond". First enter the first few letters of the contractors name in the top field. (if the contractor has not been entered into Surety2000 you will have to enter the contractor information into the system. It's easy and we'll show you later). For this presentation we are using ABC Contracting Inc. Enter abc into the field and click "next".

FIGURE 6

Surety2000 found the contractor for you. Sometimes Surety2000 will find several contractors for you with similar names. You pick the exact name by clicking on the name. In this case there is only one ABC Contracting Inc. If there was ABC Plumbing, ABC Electrical, etc. you would choose from that selection.
Click on ABC.

SURETY 2000
BID BOND MANAGER
*Bid Bond Approval System Version 1.0*

Insurance Agency
John Doe

3/2/99

- Login
- Main Menu
- Contractors
- Employees
- FAQ
- Documentation
- Help

•Enter New Bid Bond Step 3 of 4

Contractor Information:
- Contractor: ABC CONTRACTING, INC.
- Address: 100 SMITH STREET
- City: ANYWHERE
- State: NY
- Zip Code: 1111111

Surety: [Select a Surety ▼]

Owner/Obligee/Job Information:
- Owner/Obligee:
- Bid Bond Form: [Select a Bid Bond Form from the list...]
- Address:
- Additional Address:
- City:
- State: [New York ▼]
- Zip Code:
- Bid Date: [ / / ]
- Estimated Contract Price:
- Amount of Bid Security:
- Contract # or IFB#:
- Description of Job:

Bid Bond Status: ○ Approved ● Pending

[ Next > ]

The contractor's name that you chose is inserted in the field. This will avoid clerical errors. Move down to "surety". The scroll down screen will list all the sureties that have authorized you. They can rescind that authority at any time from their Surety2000 website.

Complete the remaining fields. The estimated contract price is optional. Surety2000 is Year 2000 compliant. (Insert 1999 in the field for year).

FIGURE 8

SURETY 2000
BID BOND MANAGER
*Bid Bond Approval System Version 1.0*

Insurance Agency
John Doe

3/2/99

→ Enter New Bid Bond Step 3 of 4

- Login
- Main Menu
- Contractors
- Employees
- FAQ
- Documentation
- Help

Contractor Information:
- Contractor: ABC CONTRACTING, INC.
- Address: 100 SMITH STREET
- City: ANYWHERE
- State: NY
- Zip Code: 1111111

Surety: Liberty Mutual Insurance Co.

Owner/Obligee/Job Information:
- Owner/Obligee: State of Virginia Department of Transportation
- Bid Bond Form: Bid Bond in accordance with contract specifications
- Address:
- Additional Address:
- City:
- State: Virginia
- Zip Code: 12345
- Bid Date: 02/21/1999
- Estimated Contract Price: optional
- Amount of Bid Security: ten percent of bid bond not to exceed .....
- Contract # or IFB#: 654321
- Description of Job: insert job decription here Bid Bond Status: ● Approved ○ Pending

Next >

Complete all the fields remaining. You may pend this bond or approve it. Let's approve this bid bond. Be sure the approved circle is highlighted then click "next"

FIGURE 9

SURETY 2000
BID BOND MANAGER
Bid Bond Approval System Version 1.0

Insurance Agency
John Doe

3/1/99

- Login
- Main Menu
- Contractors
- Employees
- FAQ
- Documentation
- Help

→ Please Verify the information below is correct then Finish.
Date of Bid Bond Entry: 3/1/99 7:08:08 PM
Entered by: John Doe
Surety Name: Liberty Mutual Insurance Co.
NAIC#: 23043
State of Incorporation: MA
Contractor: ABC CONTRACTING, INC.
Address: 100 SMITH STREET,ANYWHERE,NY 1111111
Owner/Obligee: State of Virginia Department of Transportation
Address:
Additional Address:
Bid Bond Form: BidBond in accordance with Contract Specifications
Bid Date: 2/21/1999
Contract Price optional
Amount of Bid Security: ten percent of amount bid not to exceed...
Contract # or IFB#: 654321
Description of Job: insert description of project here.
Bid Bond Status: Approved Finish ©1997 AAWS Web Services This is a final review of all the information before the bid bond is executed. THE DATE OF THE ENTRY TO THE SECOND IS ARCHIVED The entry date and time will become the time of execution on the next screen. Note: just as a paper bid bond must be issued on time for a bid letting, a Surety2000 bid bond must be approved prior to the bid letting time. The owner/obligee will take note of this time. The NAIC code is also listed in order to specifically identify the surety.

Review the information and click on "Finish". The next screen is the bid bond.

FIGURE 10

SURETY 2000
BID BOND MANAGER
Bid Bond Approval System Version 1.0

Insurance Agency
John Doe

3/1/99

- Login
- Main Menu
- Contractors
- Employees
- FAQ
- Documentation
- Help

The Following Bond has been Approved

S2000 Bond ID: SVA991001340
Date of Bid Bond Entry: 3/1/99 7:08:08 PM
Date of Bid: 2/21/99
Date of Bid Bond Approval: 3/1/99 7:11:47 PM
Contractor: ABC CONTRACTING, INC.
Address: 100 SMITH STREET, ANYWHERE, NY 1111111
Surety Name: Liberty Mutual Insurance Co.
State of Incorporation: MA
NAIC#: 23043
Owner/Obligee: State of Virginia Department of Transportation
Address: , VA 12345
Amount of Bid Security: ten percent of amount bid not to exceed...
Description of Job: insert description of project here.
Bond Form: BidBond in accordance with Contract Specifications
Contract # or IFB#: 654321
Entered by: John Doe

[ Print Bond ]

Owner/Obligee [            ]  [ Search ]

Contractor [            ]  [ Search ]

©1997 AAWS Web Services

This is your electronic bid bond. The code at the top is the "authorization code". This code must be given to your contractor. The contractor will present this code at the bid letting along with the bid. The owner/obligee will login to Surety2000, insert the "authorization code" and view the bid bond as you see it here.

The surety will be able to view all executed bid bonds by their agents.

You may print this screen and use it to fax the code to your contractor and retain it for your records.

A bid bond can be executed or put into pending by knowledgeable surety personnel in less than ninety seconds.

Surety2000 has been proven to save money, decrease errors, deter fraud, and provide an overall better service to your contractor.

FIGURE 11

Complete information that must be reproduced on the bid bond such as complete name and address. Contact person and telephone number is optional. Click "submit" and you can execute their first bond.

A contractor has to be entered into Surety2000 before a bid bond can be executed. There is no fee for entering a contractor. As you use the system you will enter a contractor when you are entering the first bid bond for that contractor. (You could enter your entire list all at once if you choose.)

Go to the vertical column at the left. Click on "contractors". You can search for an existing contractor or enter "new contractor". Click on "new contractor" and complete the fields on the next screen.

FIGURE 12A

SURETY 2000
BID BOND MANAGER
Bid Bond Approval System Version 1.0

Insurance Agency
John Doe

3/1/99

Surety Employee List

| Login |
| Main Menu |
| Contractors |
| Employees |
| FAQ |
| Documentation |
| Help |

Search | New Employee

You may select Edit, Add, or Delete from the table below: Page 1 of 1

| Surety Agent | User Name | Phone | Action... |
|---|---|---|---|
| John Doe | Insurance | 555-555-5555 | Edit... Delete |

©1997 AAWS Web Services

You can grant employees power of attorney. A surety must enter your agency first and empower one person and grant that person administration ability. That individual can enter or delete powers from employees.

Use the vertical bar at the left. Click "employees". Click "new employees" on the horizontal bar.

FIGURE 13

SURETY 2000
BID BOND MANAGER
*Bid Bond Approval System Version 1.0*

Insurance Agency
John Doe

3/1/99

Enter Employee Information Below 7995

| | |
|---|---|
| Employee Name | John Doe |
| Address | Broadway |
| City | Anywhere |
| State | NY |
| Zip Code | 121212 |
| Phone Number | 555-555-5555 |
| Login Name | Insurance |
| Password | **** |
| Verify Password | **** |
| Admin Access | ✓ |
| Enabled | ✓ |
| | Submit   Reset |

- Login
- Main Menu
- Contractors
- Employees
- FAQ
- Documentation
- Help

©1997 AAWS Web Services

Complete the fields. Allow the employee to enter their own password. Decide if you want to pass on the administration ability or not. Click "submit" and that employee can login to Surety2000. You can enter this section, search for an employee and "unauthorize" within seconds.

A password cannot be retrieved by anyone or even Surety2000. If a password is forgotten a new password must be submitted.

FIGURE 14

SURETY 2000
BID BOND MANAGER
Bid Bond Approval System Version 1.0

- Login
- Introduction
- Jobs
- News
- Documentation
- FAQ
- Help

→ Enter your login information and push the Login button.
You must have a valid user name and password to access the system!

User Name: | Illinois | Password: | **** | Login |

Authorized access only!
Do NOT give your user information to ANYONE!

©1997 AAWS Web Services

This is the login page. You will need a user name and password. Each owner/obligee will be given one user name by Surety2000. That person will choose a password and also decide who will be able to use the system within their agency. . An owner/obligee can only *view* executed bid bonds. No changes or transactions can be made.

We have used the State of Illinois Department of Transportation for the purposes of this presentation. The user name and password are entered and then click next.

FIGURE 15

This is the owner main menu. At the bid letting contractors will present "authorization codes". Simply insert the code in the "bond number" field and click submit. The code begins with "s". (surety). The next two letters are the State (il. Illinois). The next two numbers are the year the bond was executed (99). The remaining numbers are unsequenced and selected by the Surety2000 server.

FIGURE 16

This is the electronic Surety2000 bid bond. The exact date and time of the bid bond approval is archived. The name of the surety and the NAIC code is submitted. This code designates the exact surety and avoids the confusion of similar surety names. The name of the person who executed the bid bond is at the very bottom.

All information that is inserted in bid bond forms is presented here. The bid bond form is herein agreed that it is the form within the specification.

This screen can be printed and retained.

Simply insert the next authorization code in the bond number field and click submit to view the next bid bond.

FIGURE 17

BMS Login Form

CompanyID:

Username:

Password:

Log

FIGURE 19

Company Name:

Contact Person:   Phone Number:

Address:

City:

State / Province:   Zip:   Country:
[ -- State or Province -- ▼]   [   ]   [            ▼]

[Add]

FIGURE 21

Company Name:

Contact Person:                Phone Number:

Address:

City:

State / Province:        Zip:     Country:

State Of Incorporation        NAIC Number:

Update

FIGURE 23

Division:

Address:

City:

State / Province:          Zip:        Country:

State Of Incorporation          NAIC Number:

Company Name:

Contact Person:     Phone Number:

Address:

City:

State / Province:    Zip:    Country:

State Of Incorporation    NAIC Number:

Add

FIGURE 25

Company Name:

Contact Person:          Phone Number:

Address:

City:

State / Province:     Zip:     Country:

Update

FIGURE 28

Subsidiary:

Address:

City:

State / Province:     Zip:    Country:

Add

FIGURE 29

First Name        Last Name

Title

Address

City:

State / Province:      Zip:       Country:

Phone             Permissions

Username:   Password:   Verify Password:

[Add]

FIGURE 30

Add Preferred Contractor: To add to your list of preferred contractors, search for the contractor you wish to add using the form below.

Federal Tax ID: [    ] [Search]

FIGURE 31

Company Name:

Tax ID Number:     Phone Number:

Address:

City:

State / Province:     Zip:     Country:

Add

FIGURE 33

First Name          Last Name

Title

Address

City:

State / Province:    Zip:    Country:

Phone           Permissions

Username:   Password:   Verify Password:

Add

FIGURE 34

Form used to update existing surety information. The update form appears below.

Division:

Address:

City:

State / Province:     Zip:     Country:

State Of Incorporation

Add

FIGURE 39

Contains form to update Agency information. The form used appears below:

Company Name:

Contact Person:   Phone Number:

Address:

City:

State / Province:   Zip:   Country:

Update

FIGURE 40

The add subsidiaries form appears below:

Subsidiary:

Address:

City:

State / Province:   Zip:   Country:

Add

FIGURE 41

COMPUTERIZED METHOD, APPARATUS AND SYSTEM FOR ISSUING SURETY BONDS

This application claims priority on U.S. Provisional Patent Application Ser. No. 60/161,212, filed Oct. 22, 1999.

FIELD OF THE INVENTION

The present invention is in the field of improvements in the issuance of surety bonds and related products.

BACKGROUND OF THE INVENTION

By the term surety bond is generally meant a bond issued by an insurance or other company as surety on behalf of a principal whereby the surety legally binds itself to an obligee for an amount of money guaranteed to the obligee for the faithful performance of a contract or other act of the principal. The bonds of the present invention can include bid bonds, contract, court and subdivision bonds, performance bonds, customs bonds, notary bonds, liquor license bonds, license and permit bonds, small business administration bonds, bail bonds, supersedeas bonds or other bonds required in litigation, etc. Also applicable to the invention are binding certificates of insurance and policy endorsements and other insurance related documentation.

When a contractor, builder or supplier etc. wishes to bid on a construction project or submit a bid in connection with a governmental purchase of equipment or supplies the entity seeking bid typically requires that for a bidder to be considered for the job a bid bond must be submitted with the bid. Many municipalities have their own bid form and others use a format approved of by the American Institute of Architects. In the typical bid bond the principal is the person who is submitting the bid. The surety is typically an insurance or bonding company who pursuant to the bond is "held and firmly bound" to the entity seeking the bid for a predetermined sum, usually some percentage of the bid amount. In the event the bid is accepted the bond becomes effective and protects the entity awarding the contract by assuring the entity of faithful performance of the contract as well as prompt payment of labor and materials furnished in performing the contract. In addition, the bond protects the bid seeking entity from the failure of the winning bidder from ultimately entering into the contract that is being awarded by paying the difference between the winning bid and the amount that the entity would have to pay to another party to complete the project because of the default.

Each bidder submits a bid bond with its bid in the appropriate form decided upon by the entity seeking the bids. In the event the wrong form of bid bond is used the party submitting the bond runs the risk that the entity soliciting the bonds will reject the bid out of hand even if the person submitting the bond was the low bidder. Many agencies soliciting bids are reluctant to accept a bid with an improper bid bond form because there is a risk that the losing bidders who submitted the proper form may challenge the agency if it awards the bid to based on an improper bid form.

When a contractor, for example, is submitting a bid, much of the contractor's effort is spent massaging the bid to make sure the contractor has a bid that he considers is his best for the particular job. Since much of the pre bid effort is spent calculating and recalculating material and/or labor costs, frequently a bid bond is not sought by the contractor until just before the bidding deadline. In addition, many contractors are bidding on a plurality of jobs at a time. Furthermore, for many projects and contracts there are multiple bidders bidding on the project. For the non winning bidders their bond terminates and only the winning bidder's bond has any effect. As a result a great deal of effort has to be done in a short period of time to prepare multiple bonds.

Surety companies typically rely on local agents to receive the bond request and process the necessary paper work to complete the bid bond. For certain bond requests where the amount of the bond request is low the agent may have authority to issue a bond without approval from the surety company. For other requests the surety company must approve the bond requests. One of the problems that agents have in submitting bonds for approval is that the requests are typically faxed to a central location at the surety company where they sit for an extended period of time before the request is presented to the proper person for approval of the request. Once the bond request is approved, the agent must prepare the actual bond which must be signed by the agent on behalf of the surety company. In order to save time in the process many surety companies provide their agents with executed powers of attorney for them to retain at their offices until needed. While this procedure saves considerable time in the procedure of issuing bonds there is also the risk that an agent could issue a bond inappropriately to an unsatisfactory party. While the procedure described above is for bid bonds, the current steps and procedures for issuing other types of bonds are similar.

As a result of the time deadlines and security issues in the current methods and procedures for issuing bonds there is a need for improved methods and apparatus for obtaining bonds.

OBJECTS OF THE INVENTION

It is an object of the invention to provide a method of obtaining bonds using a computer system.

It is an object of the invention to provide a system and apparatus for computerizing the issuance of bonds.

It is an object of the present invention to provide increased security in the issuance of bonds.

It is an object of the invention to improve the time necessary for issuing bonds.

SUMMARY OF THE INVENTION

The invention is directed to improved methods, apparatus and system for issuing and transmitting surety bonds, including but not limited to bid bonds, contract, court and subdivision bonds, performance bonds, customs bonds, notary bonds, liquor license bonds, license and permit bonds, small business administration bonds, bail bonds, supersedeas bonds or other bonds required in litigation, etc. The present invention also has applicability in the field of insurance and other businesses including but not limited to binding certificates of insurance and policy endorsements. The invention relates generally to computerized systems and more particularly to a computerized system for automated issuances of bonds through a communications linkage for communicating and processing information necessary for the issuance of a bond in a timely and efficient manner. The invention also relates to a system for the collection, processing, and dissemination of bond related information generated from the application process.

The present invention is a computerized system for automated execution of bonds through an Internet or Intranet website or other communications linkage for communicating and processing information. In addition, the present invention permits designated persons to view approved bonds from remote locations as a security feature. In order to log onto the system a user account and/or password are inputted.

BRIEF DESCRIPTION OF THE DRAWINGS

FIG. 1C is a view of a representative logon page for access to the system.

FIG. 2 is a view of a representative agency main menu for the system.

FIG. 3 is a view of a representative agency pending bond search page for the system.

FIG. 4 is a view of a representative surety pending bonds page for the system.

FIG. 5 is a view of a representative pending bond page for the system.

FIG. 6 is a view of step 1 on a representative new bond page for the system.

FIG. 8 is a view of step 3, the selection of the surety, for the preparation of a new bond.

FIG. 9 is a view of the page of FIG. 8 with additional information added.

FIG. 10 is a view of a verification page for the new bond.

FIG. 11 is a view of an approved bond.

FIG. 12A is a contractor search page.

FIG. 13 is a page listing approved employees of the agency.

FIG. 14 is a page for identifying the approved employees of the agency.

FIG. 15 is a representative page for an obligee to logon to view executed bid bonds.

FIG. 16 is a representative page for the obligee to submit the contractor code to view a contractors bond information.

FIG. 17 is a representative page showing the executed contractor's bond.

FIG. 19 is a representative login dialog.

FIG. 21 is a representative Manager's information form.

FIG. 23 shows a representative update form.

FIG. 25 shows a representative form to add a surety

FIG. 28 shows a representative form to update Agency information.

FIG. 29 shows a representative form to add subsidiaries.

FIG. 30 shows a representative form to add new employees of the surety to the system.

FIG. 31 shows a representative preferred contractor form.

FIG. 33 shows a representative form used to Add a Contractor.

FIG. 33 shows a representative format used to add new employees of the contractor into the system.

FIG. 39 shows a representative form used to add surety divisions appears in FIG. 39.

FIG. 40 shows a representative form that may be used to update agency information.

FIG. 41 shows a form to add agency subsidiaries.

DETAILED DESCRIPTION OF THE INVENTION

Figure 1A:
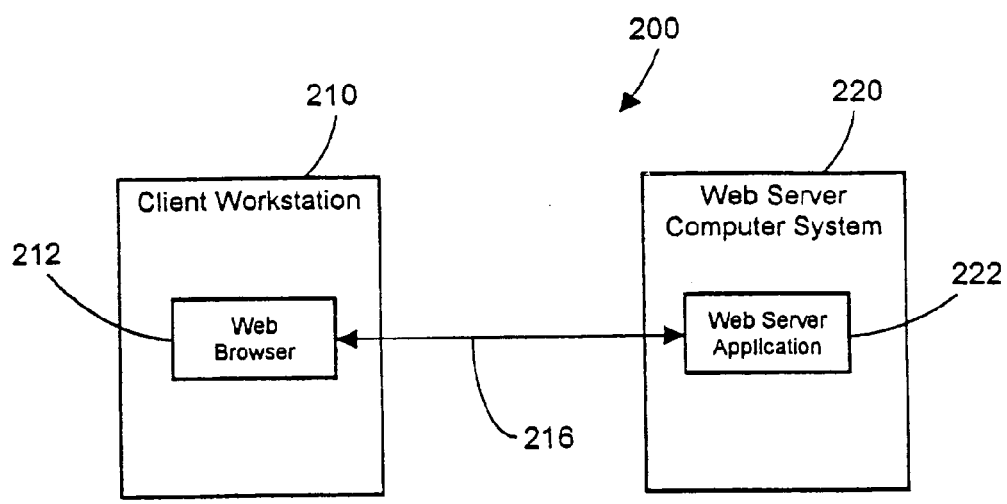
FIG. 1A shows a block diagram of a representative computer system that would be used by the user to access information over a network such as an LAN, Wan, the Internet or an Intranet.
Figure 1B:
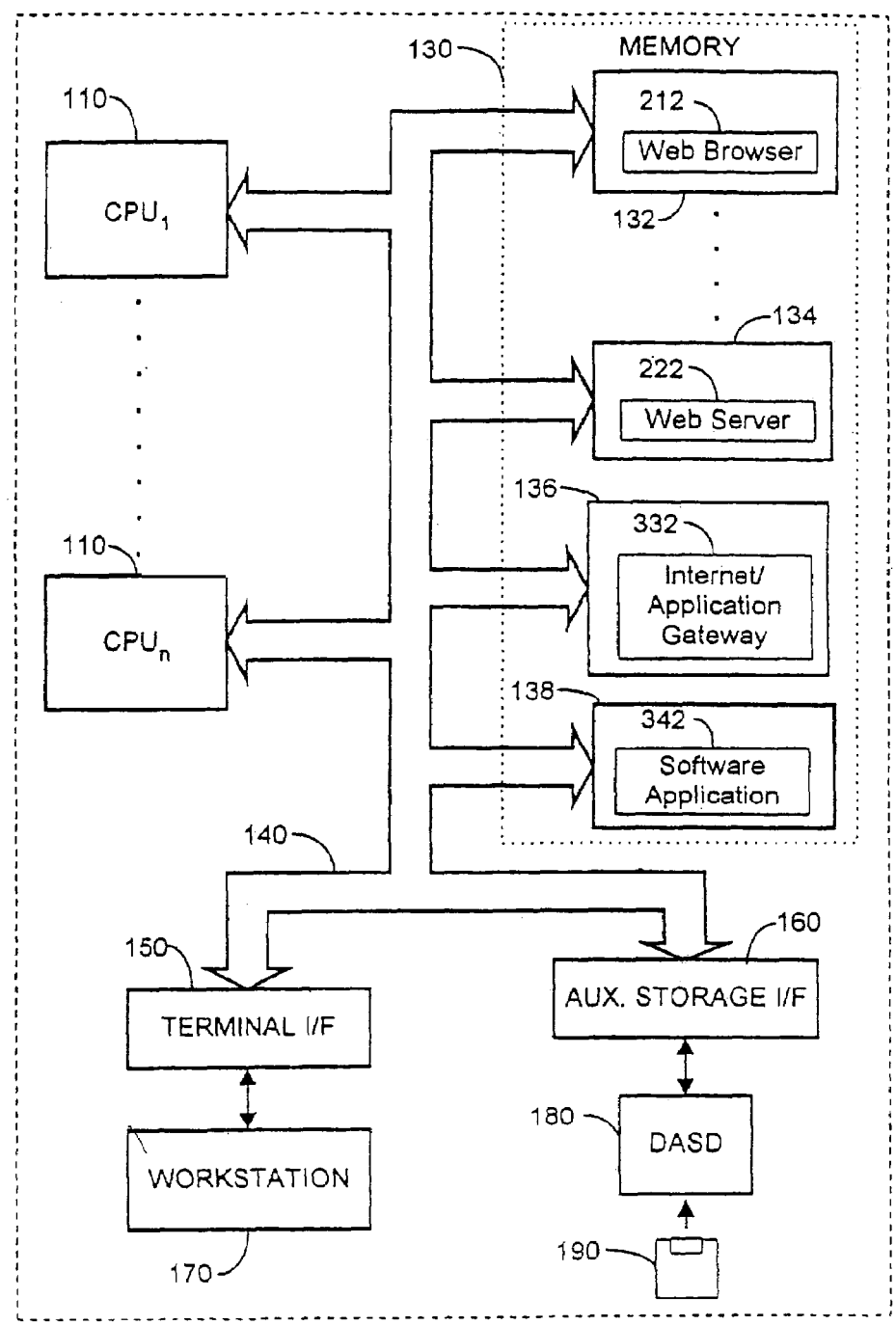
FIG. 1B is a block diagram of a system that allows access to a software application of the present invention over the World-Wide Web from a standard web browser.

In the present invention the agent or other person seeking a bid bond or any other bond has a password and/or account number in order to logon to the system from a remote location using the Internet, an Intranet or other communication means. FIG. 1A and FIG. 1B show representative computer systems that may be used by the agent in connection with the present invention. The present invention is directed to a system and more preferably a computer network for accessing the information on a network, such as the Internet. The term computer network as used herein is used in its broadest sense, i.e., as any configuration of data processing devices and software connected for information exchange. The present invention can include personal computers, personal digital assistants (PDA's), set top boxes used on or in connection with televisions, and any other type of appliance that can access a collection of data such as the Internet.

In one embodiment the appliance can include a network that serves to connect together a plurality of devices, e.g., terminals, computers, etc. Networks typically comprise a plurality of devices such as computers some of which function as servers to provide services to the other computers connected to the network. There are many types of computer networks in existence. They are known by various names including Local Area Network (LAN), Wide Area Network (WAN), Internet and the like and may be implemented in accordance with a variety of known architectures.

Referring to FIG. 1A, in one embodiment of the invention there is a typical transaction between a standard web browser or other communications software 212 running on a client workstation 210 and a web server or other software application permitting communication with said workstation 222 running on a computer system 220 occurs over a connection (communication link or communication mechanism) 216. Client workstation 210 may be coupled to other computer systems via a local area network (LAN) or via any other type of computer network or other interconnection.

Likewise, computer system 220 may be coupled to other computer systems as well. Client workstation 210 may be any computer that is capable of providing access to a local area network (LAN) or via any other type of computer network or other interconnection to the WWW by using web browser or other communications software 212. This would include handheld, portable or laptop computers, standard desktop computer systems, etc.

Web browser 212 is a software program running on client workstation 210 that allows a user at client workstation 210 to communicate with other computers over connection 216. Web browser 212 would include but is not limited to any web browser, which is capable of transmitting and receiving data over the WWW. This includes commercial software applications such as IBM's WebExplorer, Internet Netscape Navigator, Microsoft Explorer, Apple Computer's Cyber-Dog, and any other software application which now exist or which may be developed in the future for accessing or processing information over the WWW. The preferred embodiment for connection 216 is any suitable communication link or communication mechanism to the Internet, including by telephone, cable lines or other hard wired method, infrared or other wireless communications, wireless computer network communications, or any other suitable connection between computers, whether currently known or developed in the future.

It should be noted that client workstation 210 and web server computer system 220 may be the same physical and/or logical computer system. Web browser 212 typically displays pages of data including but not limited to data in the form of HTML, XML, XHTML or their future incarnations to a user at client workstation 210. Other types of data (besides HTML) may also be transmitted to web browser 212, including text data, graphical data (e.g., Graphic Image Format (GIF) files), audio data or sound files (e.g., WAV files), Java applets (executable code) and a specialized data form known as Multipurpose Internet Mail Extensions (MIME) data (which may include combinations of the foregoing and other data types).

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other applications are also compatible with the present invention. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through a page that has been constructed at an earlier time or by another computer.

Web browser 212 typically interacts with web server application 222 by transmitting input (e.g., a Uniform Resource Locator (URL) or an HTML page) over connection 216 to web server computer system 220. This input is typically transmitted using HyperText Transfer Protocol (HTTP) 1.0. Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions. The process described above illustrates a basic transaction over the Internet, recognizing that many details and variations that are within the scope of the present invention are not disclosed herein for the purpose of providing a simple context for understanding the concepts of the present invention.

In a preferred embodiment, the user seeking a bond accesses the web site of the bonding agency usually by inputting a URL for the appropriate web site. The web page is displayed on the monitor of client workstation 210. Web pages are generally written in Hypertext Markup Language (HTML). However, they can be written in XML, XHTML or their future incarnations. When web server application 222 running on web server computer system 220 receives a web page request, it will build a web page in HTML or retrieve a file containing a pre-built web page and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprises the "World-Wide Web" (WWW).

Referring now to FIG. 1B, a computer system in accordance with one embodiment of the present invention may include: one or more Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 3, memory 130 may be a single type of memory component or may be composed of many different types of memory components. For example, web browser 212 running in location 132 may be part of system 100's cache memory. In addition, memory 130 and CPUs 110 may be distributed across several different computer that collectively comprise system 100. For example, web browser 212 may reside on one computer with CPU, web server application 222 may reside on another computer system with a separate CPU.sub.2, Internet/application gateway 332 may reside on a third computer system with a different CPU.sub.n−1, and software application 342 may reside on a fourth computer with a different CPU.sub.n. Computer system 100 of FIG. 3 simply illustrates many of the salient features, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 11 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 3, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

The agent using the present invention is pre-approved by a surety company just as the agent is currently pre-approved by one or more surety companies. Under the present invention the agent is not provided with a number of executed power of attorney forms by the surety company as is done with the present system. This avoids the risk of the agent granting unauthorized bonds. As seen in FIG. 1C, the agent inputs the user name and the password to access the system. Once this data is typed, the user may be logged in.

Figure 7:
FIG. 7 is a view of step 2, the contractor search, for the preparation of a new bond.

FIG. 2 depicts the main menu which appears after login. The system has identified the user and the date. Once logged in properly the user can navigate any part of the system. Once the agent supplies his or her password and/or account number the agent has access where the agent can obtain a new bond, search for an approved bond, including older bonds, check on the status of a pending bond or search for a dead bond. The system is designed so that the agent will only have access to information only on those bonds which he is authorized to view. In the event the agent seeks a new bond, each bond request is entered into the system by the agency. The information inputted for each new bond typically includes the name of the contractor, its address, the identity of the owner/obligee for whom the bond is required, the bond form required, the owner/obligee's address, the bid date, the estimated contract price, the amount of the bid security, the contract number or IFB number, and a description of the job. A representative screen for a new bond is shown in FIG. 6. Once this information is inputted into the system the bond information the program provides a list of sureties surety where the agent has been authorized and the agent selects the surety from the list. The obligees typically include governmental agencies, private owners, construction managers, and/or general contractors FIG. 8 and FIG. 9. In the event there are more than one contractors with the same name a screen similar to FIG. 7 may appear in order for the choice to be narrowed down to the appropriate selection.

One advantage of the invention is that the surety can rescind the agent's authorization at any time from the website, thus preventing unauthorized bonds being issued. In the event a surety wants to cease doing business with one of its current agents, under the prior system the surety had to recall all of the outstanding powers of attorney and rely on the good faith of the agent to return all the existing executed powers of attorney that the surety had previously provided to the agent. Since an agent is usually dropped by a surety for malfeasance of misfeasance there was always a risk to the surety company as the agent could bind the company to unauthorized obligations with the existing executed powers of attorney. This problem is solved by the present invention since the surety no longer needs to supply the agents with pre-signed powers of attorney and the surety can remove an agent from its list of approved agents virtually instantaneously by access the program and removing the agent's authority. In that event the surety dropping an agent will not be identified as one of the sureties on the list for the agent to select. After selecting the surety, the agent can submit the bond for approval or the information can be retained in the system as a pending bond and can be submitted at a later time.

Once the agent selects the appropriate surety for the particular bid and the agent seeks approval, the agent is given an opportunity to check over the information included for errors. FIG. 10 shows a representative screen for the user to review the key information before the bond is executed. The NAIC code identifies the surety. The date and time to the second can be archived at the time of execution on the screen of FIG. 11. If the information in FIG. 10 is correct then the time of the application is recorded since many obligees require that a bond be obtained prior to a particular deadline and the bid information is transmitted directly to the appropriate person at the surety electronically. A cautionary notice should appear prior to approval of the bond. This warning will query the user to be sure that the bond is to be approved. When the bid information is transmitted to the appropriate person at the surety, that person's computer will provide a message that a bid has been received. This approach avoids the delays inherent in the prior system where facsimile transmissions of the bid information were relied on. Where a facsimile was used, the bid information would be transmitted to the fax machine which was not necessarily near the desk of the person with responsibility to act on the bid application. The agent would then have to wait until the bid was brought from the fax machine location to the surety's appropriate person. This added delays to the system that are avoided using the present invention.

Figure 12:
FIG. 12 is an enter contractor page which permits the agent to place his contractor information in the system prior to needing the information for a bond.

Under the prior system of obtaining bonds once the bond was approved by the surety the agent would then have to put the paper work together and send it to the contractor. Since the bond was typically not requested by the contractor until just before the deadline delivery to the contractor usually required hand delivery or delivery by overnight courier withall the trouble that weather and other delays can engender.Under the present invention these problems are avoided. Once the bid is approved, the contractor is provided with a code number typically called an authorization code. FIG. 11 is a screen that shows the electronic bond. The contractor places the code on his bid papers and submits them to the obligee at the bid letting. The obligee logs onto the system and provides the contractors authorization code to review the bid. The surety can also use the system to search bonds by number as seen in FIG. 16. The system also permits the surety to view, in real time all of the executed bonds of each agent for quality control purposes. Another advantage for the agent is that the agent can limit access to the system by limiting the individuals who access to the authorization code and/or password. Since the agent can change his password as necessary, the agent has more control over employees and can prevent certain employees from having access to the system. In addition, when an employee leaves employment the agent can change the password without having to worry about unauthorized access to bonds and bond information. FIG. 12 is a contractor information screen for the contractor to input information. FIG. 12A is a screen to search for a contractor. FIG. 13 is a screen for the agency to input employee information for the employee to have authority to issue bonds. Initially, once the surety approves of the agent one key person at the agency will be the authorized person at the agency for all bonds. This may be the owner manager or some other person. This key person can, if desired, grant sub-authorizations to other employees that permit these additional persons to issue bonds. The number of these sub-authorizations may be increased, decreased or terminated completely as needed. This authority can be readily cancelled if any impropriety is uncovered. FIG. 14 shows a representative screen for the authorized employee of the agency to fill out to have access to the system. FIG. 15 is a representative example of the log in page for the owner/obligee to access all the bonds information. For example, the name of the organization for whom the bonds were issued may be inserted and information on all of the selected executed bonds is accessed. No changes or transactions may be made to the bonds.

In FIG. 3 an example of a screen for a user to search pending bonds is shown. The name of the contractor or the name of the owner/obligee is inserted and a search may be performed. In the event all pending bonds are to be searched, the fields are left blank and the user merely clicks the search box. FIG. 4 shows an example of a listing of bonds in chronological order by the bid date. The list may be used as a daily or other work list of the bonds to be approved. The appropriate surety company can see the pending bond and accept it as a bid bond request. FIG. 5 shows the screen for a pending bid bond. The screen lists all the necessary information in order for it to be approved. FIG. 17 is an example of the electronic bid bond of the present invention. The exact date and time of the bid bond approval is archived. The name of the surety and the surety's NAC code is identified. This code designates the exact surety and avoids the confusion of similar surety names. The name of the person who executed the bid bond is at the bottom. This form can be modified so that the necessary information for each jurisdiction is available.

Figure 18:
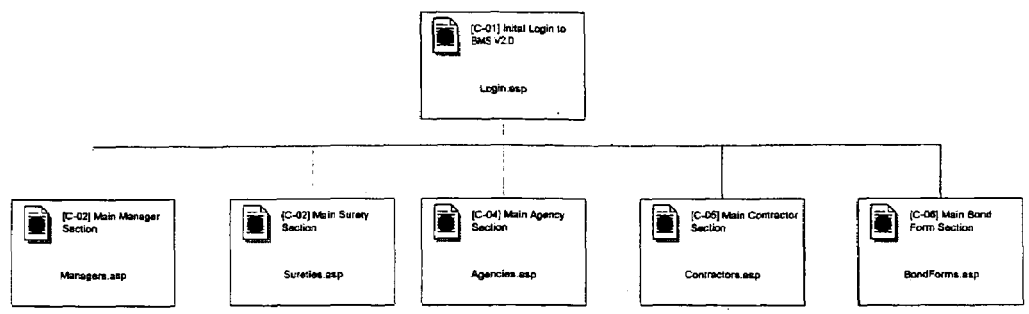
FIG. 18 is a flow chart showing the main client navigation.

FIGS. 18–42 show an alternate embodiment of the present invention. FIG. 18 is a flow chart showing the main client navigation.

[C-01] Initial Login to BMS V2.0

The login requires the Manager, Surety, Agency, Principal or Contractor to enter their Company ID, Username and password. The username and password are encrypted and stored within the database. The representative login dialog appears in FIG. 19

[C-02] Main Manager Section

If the user has manager access, the user will have the choice of adding a manager or searching for viewing existing managers by name

[C-03] Main Surety Section

If the user has Surety access, the user will have the choice of adding a Surety or searching for viewing existing Sureties by name

[C-04] Main Agency Section

If the user has Agency access, the user will have the choice of adding an Agency or searching for viewing existing Agencies by name

[C-05] Main Contractor Section

If the user has Contractors access, the user will have the choice of adding a Contractor or searching for viewing existing Contractors by name

[C-06] Main Bond Form Section

Lists all of the Bond forms for the company that the user logged in belongs to.

Managers [CM-01 Thru CM-04]

Figure 20:
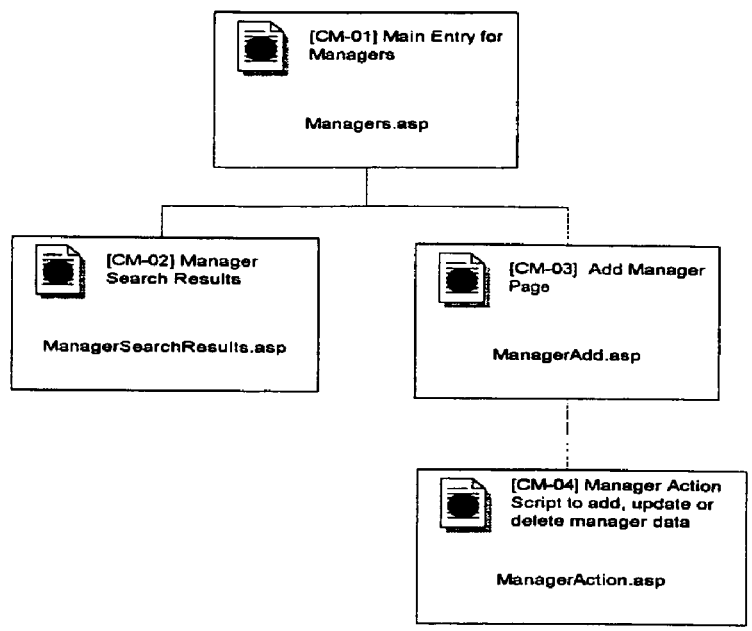
FIG. 20 is a flow chart showing the Managers section of the program.

FIG. 20 is a flow chart showing the Managers section of the program.

[CM-01] Main Entry for Managers

If the user has manager access, the user will have the choice of adding a manager or searching for viewing existing managers by name.

[CM-02] Manager Search Results

Allows Managers to search managers within their company by first letter or by name. The user can also delete the manager's information from this page.

[CM-03] Add Manager Page

Allows users with mangers access to add managers within their company. The representative Manager's information form appears in FIG. 21.

[CM-04] Manager Action Script to add, update or delete manager data

Called by the add manager above to execute additions, updates or deletions.

Sureties [CS-01 Thru CS-18]

Figure 22:
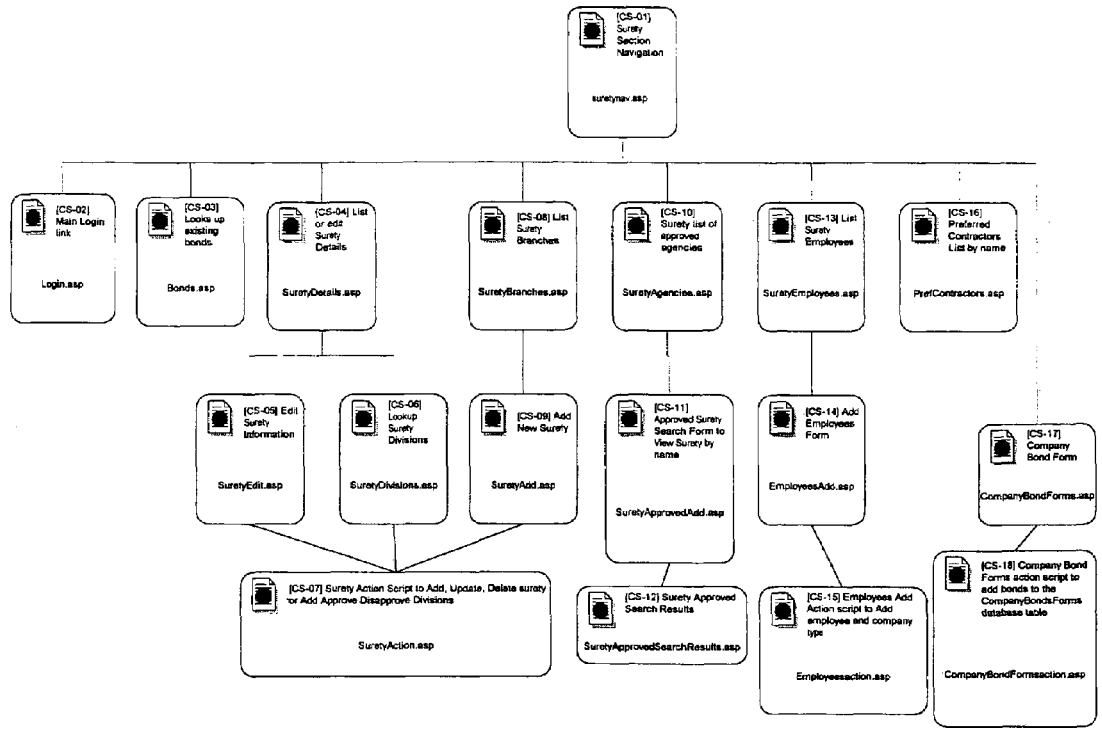
FIG. 22 shows a flow chart for the Sureties section of the program.
Figure 24:
FIG. 24 shows a representative form used to add divisions.

FIG. 22 shows a flow chart for the Sureties section of the program

[CS-01] Surety Section Navigation

If the user has surety access, the user will have the choice of adding a surety or searching for viewing existing surety by name

[CS-02] Main Login link

The login requires the Manager, Surety, Agency, Principal or Contractor to enter their Company ID, Username and password. The username and password are encrypted and stored within the database.

[CS-03] Bond Lookup

This page contains scripts needed to look up existing sureties and branches tied to the company ID of the logged in user.

[CS-04] List Surety Details

Allows the listing of surety details. This includes surety divisions and branches listed under the parent surety.

[CS-05] Edit Surety Information

Form used to update existing surety information. Representative update form appears in FIG. 23.

[CS-06] Add Surety Divisions

Contains form to add surety divisions. Representative form used to add divisions appear in FIG. 24.

[CS-07] Surety Action Script to Add, Update, Delete Surety or Add, Approve, Disapprove Divisions This page is used to house scripts used to add, update, delete surety of add, approve, disapprove divisions

[CS-08] List Surety Branches

Form and logic used to display surety branches. The page also has an Add branches capability.

[CS-09] Add New Surety

Used to add a new surety. Representative form appears in FIG. 25.

[CS-10] Surety List of Approved Agencies

The user can list and select approved agencies from this page. The user can also view the agency, the division that the agency is in and the approved limit for that agency. New agencies can be added and existing agencies can be edited or removed.

[CS-11] Approved Surety Search Form to View Surety by Name

Search form to view approved surety by name.

[CS-12] Surety Approved Search Results

View search results for the view approved surety by name search.

[CS-13] List Surety Employees

Displays list of employees and their access level within the system. The access types are listed as administrator, Executive or Clerical.

[CS-14] Add Employees Form

Figure 26:
FIG. 26 depicts a representative form to add new employees of the surety to the system.

The add employees form is used to add new employees of the surety to the system. A representative form is shown in FIG. 26

[CS-15] Employees Add Action Script to Add Employee and Company Type

This script adds employees for all entities within the system (Agency, Principle, Contractors and Managers. It also checks for duplicate users within the system.

[CS-16] Preferred Contractors List by Name

Lists all preferred contractors for the logged in surety

[CS-17] Company Bond Form

Presents the appropriate bond form for the surety or agency

[CS-18] Company Bond Forms Action Script to Add Bonds to the Company Bonds Forms Database Table Script used by the company bond form to add bonds to the system.

Agencies [CA-01 Thru CA-18]

Figure 27:
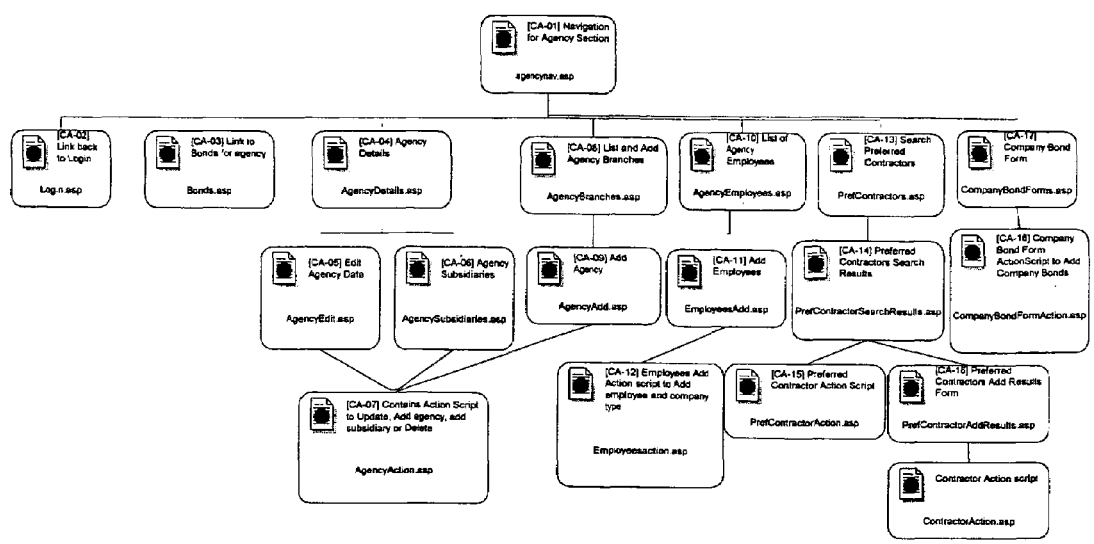
FIG. 27 shows a flow chart for the Sureties section of the program

FIG. 27 shows a flow chart for the Sureties section of the program

[CA-01] Navigation for Agency Section

If the user has Agency access, the user will have the choice of adding an Agency or searching for viewing existing Agencies by name

[CA-02] Link back to Main Login

The login requires the Manager, Surety, Agency, Principal or Contractor to enter their Company ID, Username and password. The username and password are encrypted and stored within the database.

[CA-03] Bond Lookup

This page contains scripts needed to look up existing sureties and branches tied to the company ID of the logged in user.

[CA-04] Agency Details

Lists details of the agency such as Company name, Subsidiaries, Employees, Employee permissions and branches.

[CA-05] Update Agency Data

Contains form to update Agency information. A representative form used appears in FIG. 28:

[CA-06] Agency Subsidiaries Add and Lookup

Lists agency subsidiaries and provides a form to add subsidiaries. A representative add subsidiaries form appears in FIG. 29:

[CA-07] Contains Action Script to Update, Add Agency, Add Subsidiary or Delete

Uses input from the subsidiaries form above. Also is used to add or delete agencies and subsidiaries.

[CA-08] List and Add Agency Branches

This is used to list or add agency branches

[CA-09] Add Agency or Branches

Form used to add an agency or branches.

[CA-10] List of Agency Employees

Returns a list of agency employees

[CA-11] Employee Add Form

The add employees form is used to add new employees of the surety to the system. A representative form appears in FIG. 30.

[CA-12] Employees Add Action Script to Add Employee and Company Type

This script adds employees for all entities within the system (Agency, Principle, Contractors and Managers. It also checks for duplicate users within the system.

[CA-13] Search Preferred Contractors

Used to list preferred contractors by name

[CA-14] Preferred Contractors Search Results

Formats the above preferred contractor search results. Allows user to add preferred contractors as well. The form uses the federal tax id as the key for the search. The representative preferred contractor form appears in FIG. 31:

[CA-15] Preferred Contractor Action Script

This page contains scripts used to update the contractor, add the contractor or delete the contractor. This script also builds the contractor ID.

[CA-16] Preferred Contractors Add Results Form

Returns a list of preferred contractors in the system. User may also add preferred contractors from this form

[CA-17] Company Bond Form

Presents the appropriate bond form for the surety or agency

[CA-18] Company Bond Forms Action Script to Add Bonds to the Company Bonds Forms Database Table Script used by the company bond form to add bonds to the system.

Contractors Area [CC-01 thru CC-07]

Figure 32:
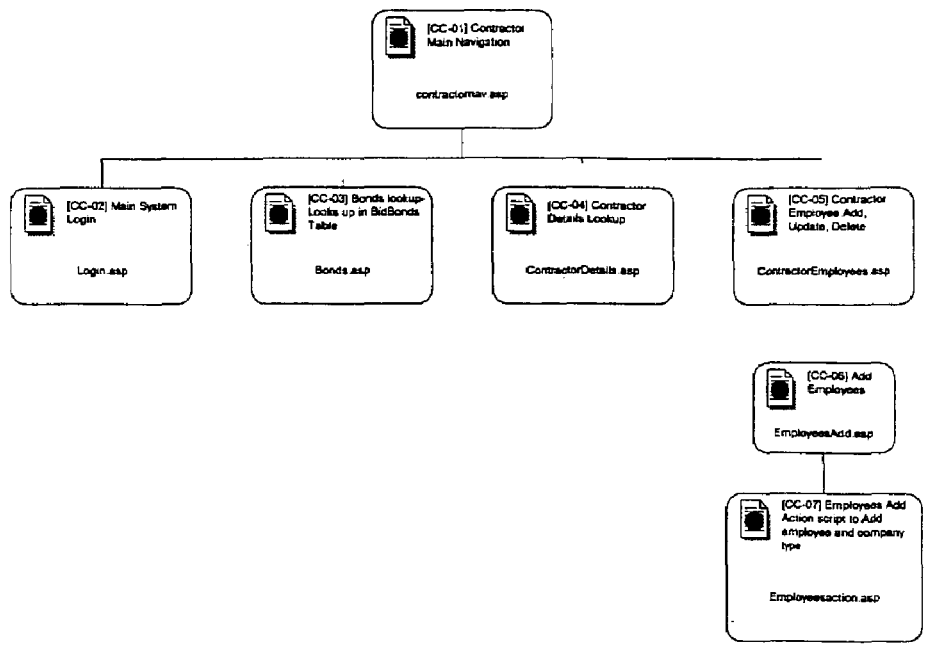
FIG. 32 show a representative flow chart for the contractors section of the program.

FIG. 32 show a representative flow chart for the contractors section of the program.

[CC-01] Contractor Main Navigation

If the user has Contractors access, the user will have the choice of adding a Contractor or searching for viewing existing Contractors by name

[CC-02] Main System Login

The login requires the Manager, Surety, Agency, Principal or Contractor to enter their Company ID, Username and password. The username and password are encrypted and stored within the database.

[CC-03] Bonds Lookup—Look Up in Bid Bonds Table

This page contains scripts needed to look up existing sureties and branches tied to the company ID of the logged in user.

[CC-04] Contractor Details Lookup

Lists details of the contractor information such as Company name and address.

[CC-05] Contractor Employee Add, Update, Delete

Representative form used to Add Contractor is shown in FIG. 33.

[CC-06] Employee Add Form

The add employees form, a representative format which is shown in FIG. 34, is used to add new employees in to the system.

[CC-07] Employees Add Action Script to Add Employee and Company Type

This script adds employees for all entities within the system (Agency, Principle, Contractors and Managers. It also checks for duplicate users within the system.

Owners/Obligee Area [CO-01 Thru CO-07]

Figure 35:
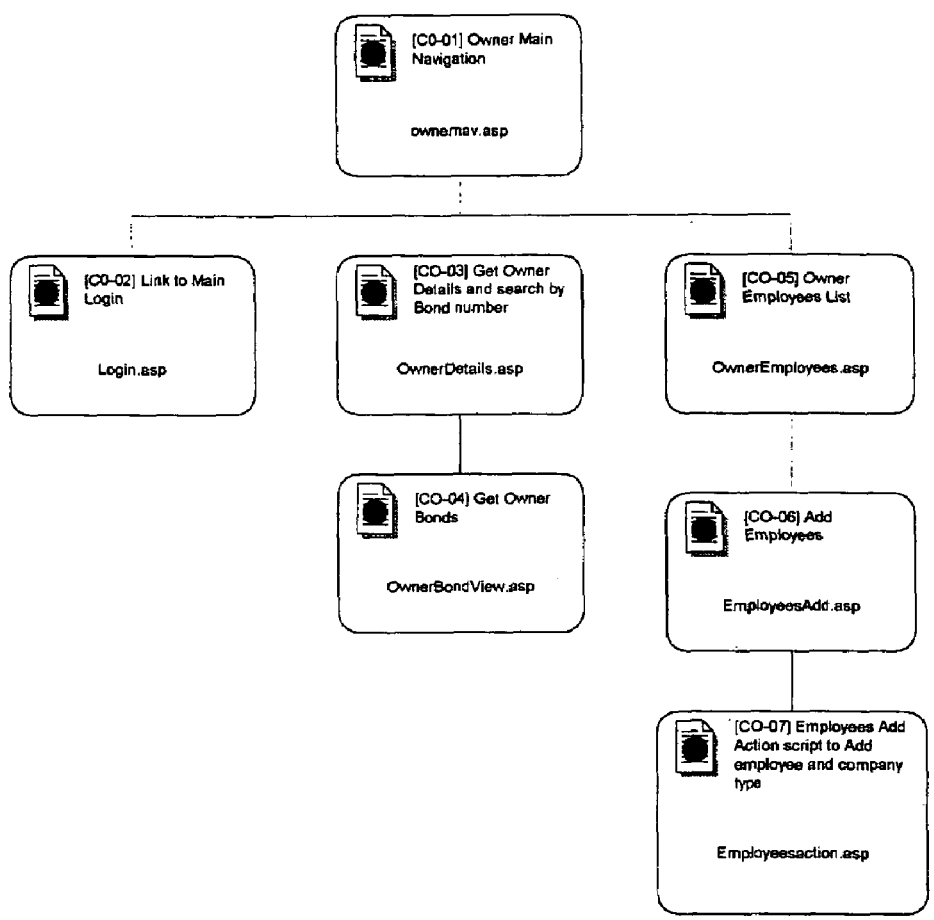
FIG. 35 show a representative flow chart for the owners/obligee section of the program.

FIG. 35 show a representative flow chart for the owners/obligee section of the program.

[CO-01] Owner Main Navigation

Main navigation for users logged in as owners.

[CO-02] Main System Login

The login requires the Manager, Surety, Agency, Principal or Contractor to enter their Company ID, Username and password. The username and password are encrypted and stored within the database.

[CO-03] Get Owner Details and Search by Bond Number

Lists details of the contractor information such as Company name and address. This form also allows the user to search by bond number

[CO-04] Get Owner Bonds

List bonds for the logged in owner.

[CO-05] Owner Employees List

Lists the employees for the owner obligee.

[CO-06] Employee Add Form

Figure 36:
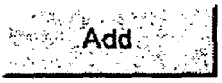
FIG. 36 shows an add employees form used to add new employees of the owners/obligees into the system.

The add employees form, a representative sample of which is shown in FIG. 36, is used to add new employees in to the system.

[CC-07] Employees Add Action Script to Add Employee and Company Type

This script adds employees for all entities within the system (Agency, Principle, Contractors and Managers. It also checks for duplicate users within the system.

Bond Forms [CB-01–CB-16]

[CB-01] Bond Main Navigation

Figure 37:
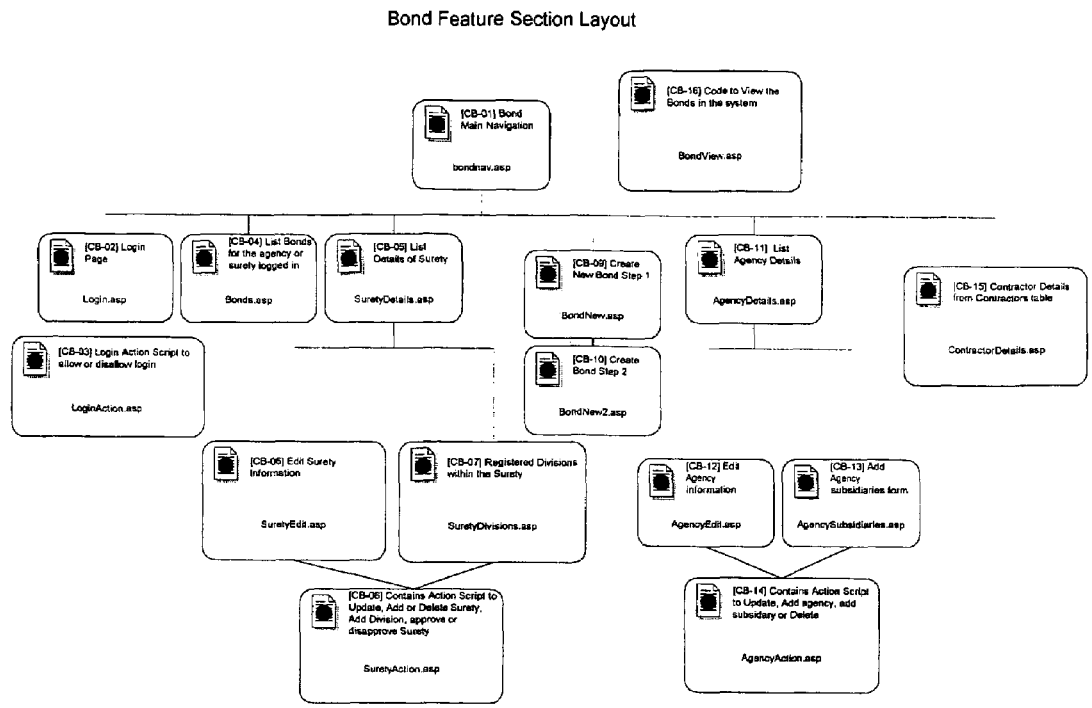
FIG. 37 shows a representative flow chart for the bonds.

A representative flow chart for the bonds for is shown in FIG. 37.

[CB-02] Main System Login

The login requires the Manager, Surety, Agency, Principal or Contractor to enter their Company ID, Username and password. The username and password are encrypted and stored within the database

[CB-03] Login Action Script to Allow or Disallow Login

This scripts decides system login authentication logic then, directs the user to the appropriate area.

[CB-04] List Bonds for the Agency or Surety Logged in

Page Returns bonds for the agency or surety logged in

[CB-05] List Details of Surety

Allows the listing of surety details. This includes surety divisions and branches listed under the parent surety.

[CB-06] Edit Surety Information

Figure 38:
FIG. 38 shows a representative form used to update existing surety information.

Form used to update existing surety information. A representative update form is shown in FIG. 38.

[CB-07] Add Surety Divisions

Contains form to add surety divisions. A representative form used to add divisions appears in FIG. 39.

[CB-08] Surety Action Script to Add, Update, Delete Surety or Add, Approve, Disapprove Divisions This page is used to house scripts used to add, update, delete surety of add, approve, disapprove divisions

[CB-09] Create New Bond Step 1

Search for a preferred contractor

New Bond Step 1: Search for a Preferred Contractor

View Preferred Contractors By Name

[CB-10] Create Bond Step 2

New Bond Step 2: Select Preferred Contractor from returned list.

[CB-11] Bond Step 3: Enter Bond Information

[CB-11] List Agency Details

Lists details of the agency such as Company name, Subsidiaries, Employees, Employee permissions and branches

[CB-12] Update Agency Data

Contains form to update Agency information. A representative form that may be used appears in FIG. 40:

[CB-13] Agency Subsidiaries Add and Lookup

Lists agency subsidiaries and provides a form to add subsidiaries. The representative add subsidiaries form appears in FIG. 41:

[CB-14] Contains Action Script to Update, Add Agency, Add Subsidiary or Delete

Uses input from the subsidiaries form above. Also is used to add or delete agencies and subsidiaries

[CB-15] Contractor Details from Contractors Table

Lists contractor information from related to this particular bond.

[CB-16] Code to List and View the Bonds in the System

This code will list and display completed bonds in the system.

4.2 Server [S-01 Thru S-0X]

[S-01] Server login—During the client login, the username and password are looked up in the database and granted or denied access depending on the user's account status

[S-02] The Database server is preferably running Microsoft SQL Server 7.0.

Figure 42:
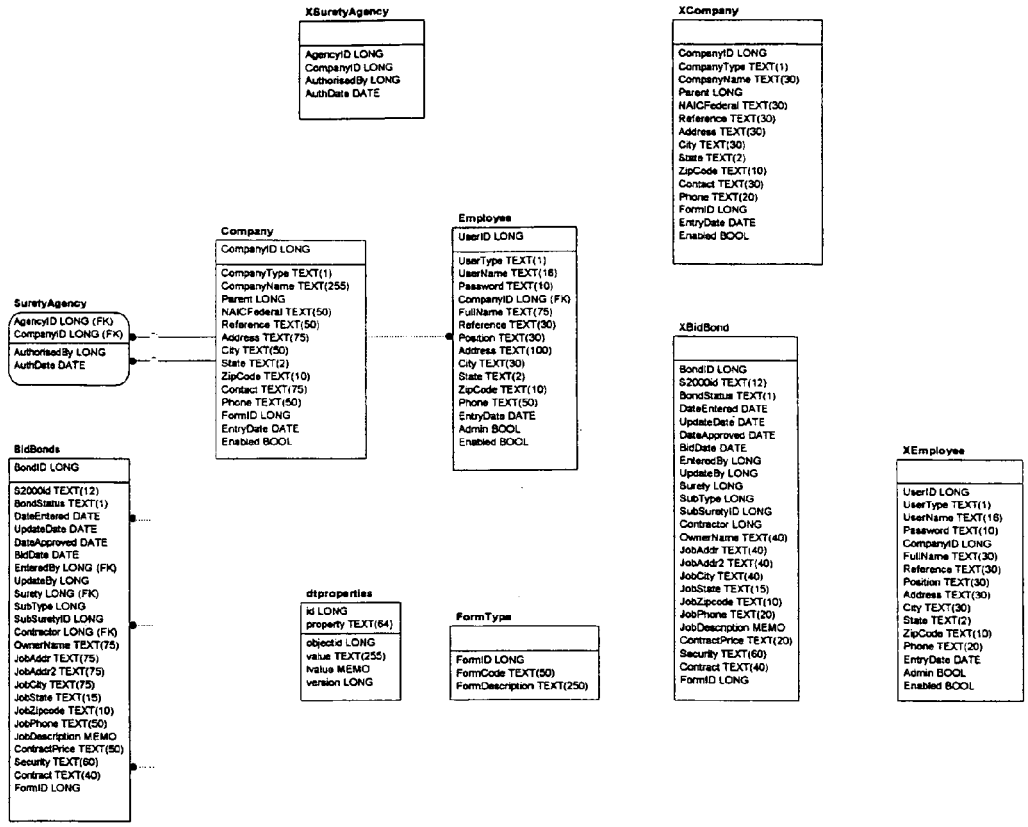
FIG. 42 depicts a representative Database table layout.

[S-03] A representative database table layout appears in FIG. 42.

Security

Preferably the databases are encrypted with 128 bit key encryption and the databases contain a specified list of users and specific roles the user has in the database. Preferably, the users each have a unique user name and password and the users are able to view only the sections specified In addition to the use of the present invention for bonds, those skilled in the art can also use the teachings of the invention for obtaining proof of insurance. Certificates of Insurance are also frequently required by contractors and others. Contractors are frequently required to present proof that their workers are covered by for example worker's compensation insurance. Certificates of Insurance are alsop required by many states before an automobile is registered. The present invention is useful in these applications also. One of the major advantages off the present invention is the reduction of fraud. In addition, there are significant cost reductions in the manner in which these insurance products are prepared pursuant to the teachings of the present invention.

I claim:

1. A method of obtaining a surety bond over a computer network, said computer network comprising, at least an agent computer, a surety computer, and a third party computer, said method comprising:
    a) receiving a request on said agent's computer for a surety bond from an applicant, said surety bond being required from said applicant by a third party, using said computer network to select a surety from one or more sureties that have approved said agent to issue surety bonds on said surety's behalf;
    b) providing said surety over said computer network with the identity of said applicant requesting said bond and such other information said surety may require about said applicant so that a surety bond may be issued by said surety;
    c) requesting from said surety over said computer network a decision on whether the bond is approved said request being received on said surety's computer;
    d) receiving from said surety over said computer network a decision on whether the bond is approved said decision being transmitted from said surety's computer, and being received on said agent's computer;
    e) where said bond request is approved by said surety, said surety providing an authorization code said authorization code being transmitted from said surety's computer over said computer network for an approved bond to said applicant;
    f) submitting said authorization code to a third party requiring said bond said third party receiving said authorization code on said third party's computer;
    g) permitting said third party requiring said bond to use said authorization code over said computer network to access said bond issued by said surety said bond being accessed from said third party's computer;
    h) issuing from said surety computer said bond through said computer network to said third party after receipt of the authorization code said third party receiving said bond on said third party's computer.

2. The method according to claim 1 wherein a contractor is provided with said authorization code that is presented at a bid letting along with said contractor's bid, said authorization code permitting an owner/obligee to receive an approved bond through said computer network.

3. The method according to claim 1 wherein the bond is a surety bond.

4. The method according to claim 1 wherein the bond is a bid bond.

5. The method according to claim 1 wherein the bond is a contract bond.

6. The method according to claim 1 wherein the bond is a court bond.

7. The method according to claim 1 wherein the bond is a subdivision bond.

8. The method according to claim 1 wherein the bond is a performance bond.

9. The method according to claim 1 wherein the bond is a customs bonds.

10. The method according to claim 1 wherein the bond is a notary bond.

11. The method according to claim 1 wherein the bond is a liquor license bond.

12. The method according to claim 1 wherein the bond is a license bond.

13. The method according to claim 1 wherein the bond is a permit bond.

14. The method according to claim 1 wherein the bond is a Small Business Administration bond.

15. The method according to claim 1 wherein the bond is a bail bond.

16. The method according to claim 1 wherein the bond is a supersedeas bond.

17. The method according to claim 1 wherein the network is accessed by a password and the bond is accessed by said authorization code.

18. The method according to claim 1 wherein said agent provides said surety with a name of a contractor, said contractor's address, the identity of an owner/obligee for whom the bond is required, an identification of the bond form required, an estimated contract price, an amount of the bid security, a contract number or IFB number, and a description of the job.

19. The method according to claim 18 wherein said owner/obligee is a governmental agency, a private owner, a construction manager, or a general contractor.

20. A system of obtaining a surety bond over a computer network, said computer network comprising, at least an agent computer, a surety computer, and a third party computer, said system comprising:

a) a means for an agent to select a surety, over said computer network, from one or more sureties that have approved said agent to issue surety bonds over said computer network on said surety's behalf, said agent using said agent's computer to select said surety;

b) a means for providing said surety, over said computer network, with the identity of an applicant requesting said bond and such other information said surety require about said applicant over a computer network, said surety using said surety's computer to receive said identity of said applicant and said other information required by said surety;

c) a means for requesting from said surety over said computer network a decision on whether the bond is approved, said decision being transmitted from said surety's computer to said computer network;

d) a means for providing an authorization code for an approved bond to said applicant to be submitted to a third party requiring said bond, said third party using said third party's computer to receive said authorization code;

e) a means for permitting said third party requiring said bond to use said authorization code over said computer network to access said bond issued by said surety;

f) a means for issuing said surety bond through said computer network to said third party after receipt of the authorization code, said third party using said third party's computer to receive said issued bond.

21. The system according to claim 20 wherein a contractor is provided with said authorization code that is presented at a bid letting along with said contractor's bid, said authorization code permitting an owner/obligee to receive an approved bond through said computer network.

22. The system according to claim 20 wherein the bond is a surety bond.

23. The system according to claim 20 wherein the bond is a bid bond.

24. The system according to claim 20 wherein the bond is a contract bond.

25. The system according to claim 20 wherein the bond is a court bond.

26. The system according to claim 20 wherein the bond is a subdivision bond.

27. The system according to claim 20 wherein the bond is a performance bond.

28. The system according to claim 20 wherein the bond is a customs bonds.

29. The system according to claim 20 wherein the bond is a notary bond.

30. The system according to claim 20 wherein the bond is a liquor license bond.

31. The system according to claim 20 wherein the bond is a license bond.

32. The system according to claim 20 wherein the bond is a permit bond.

33. The system according to claim 20 wherein the bond is a Small Business Administration bond.

34. The system according to claim 20 wherein the bond is a bail bond.

35. The system according to claim 20 wherein the bond is a supersedeas bond.

36. The system according to claim 20 wherein the network is accessed by a password.

37. A method of obtaining a surety bond over a computer network, said computer network comprising, at least an agent computer, a surety computer, and a third party computer, said method comprising:

a) receiving a request for a surety bond on said agent's computer using a computer network to select a surety from one or more sureties that have approved agent to issue surety bonds on said surety's behalf;

b) providing said surety on said surety's computer with the identity of a contractor and such other information said surety requires about said contractor and said bond over a said computer network;

c) selecting the bond over said computer network said surety using said surety's computer;

d) providing said surety with information, over said computer network, said surety receiving said information on said surety's computer, on a contract to be performed by said contractor for which said bond is required;

e) receiving from said surety a decision on whether the bond is approved, said decision being transmitted from said surety's computer, and being received on said agent's computer;

f) providing an authorization code, over said computer network, for an approved bond to said contractor to be submitted with said contractor's bid;

g) permitting a third party that requires said bond to use said authorization code, over said computer network, to obtain the bond issued by said surety, said third party receiving said authorization code on said third party's computer.

38. A method of obtaining information concerning a surety bond over a computer network, said computer network comprising, at least an agent computer, a surety computer, and a third party computer, said method comprising:

inputting into said computer network the identity of an applicant who requested a bond and such other information about said applicant that is requested by said surety;

selecting said surety, over said computer network;

said surety making a decision on whether to issue a bond on the applicant's Information provided to said computer network, said surety using said surety's computer to transmit said decision over said computer network;

said surety providing said computer network with an authorization code for an approved bond, said surety using said surety's computer to transmit said authorization code over said computer network;

receiving said authorization code on said third party's computer from said computer network by providing said network with said authorization code;

obtaining from said computer network information concerning said bond said information being received on said third party's computer.

39. A system of obtaining a surety bond over a computer network, said computer network comprising, at least an agent computer, a surety computer, and a third party computer, said system comprising:

a) a means for selecting a surety, over said computer network from one or more sureties that have approved an agent to issue surety bonds over said computer network on said surety's behalf, said agent using said agent's computer to select said surety;

b) a means for providing, over said computer network said surety with the identity of a contractor and such other information said surety may require about said contractor over a computer network, said surety using said surety's computer to receive said identity of said contractor and said other information required by said surety;

c) a means for selecting the type of bond requested by said contractor over said computer network;

d) a means for providing said surety over said computer network with information on a contract to be performed by said contractor for which a bond is required, said surety using said surety's computer to receive said information on said contract;

e) a means for requesting from said surety over said computer network a decision on whether the bond is approved, said request being received by said surety's computer;

f) a means for providing an authorization code for an approved bond over said computer network to said contractor to be submitted with said contractor's bid;

g) a means for permitting a third party that requires said bond to use said authorization code to obtain the bond issued by said surety over said computer network, said third party receiving said authorization code on said third party's computer.

40. A method of obtaining a surety bond over a computer network, said computer network comprising, at least an agent computer, a surety computer, and a owner/obligee computer, said method comprising:

an applicant for a bond said applicant accessing a website of a bonding agent through a login and a password;

entering a bond request to said bonding agency over said computer network;

providing said bonding agency with a name of a applicant, said applicants address, the identity of an owner/obligee for whom the bond is required, an identification of the bond form required, an estimated contract price, an amount of the bid security, a contract number or IFB number, and a description of the job over said computer network;

said bonding agent selecting a surety over said computer network for issuing a bond from one or more surety companies that have pre-approved said agent applying for said bond, said bonding agent using said bonding agent's computer to select said surety;

selecting over said computer network said bond from the group consisting of, bid bonds, contract bonds, court bonds, subdivision bonds, performance bonds, customs bonds, notary bonds, liquor license bonds, license bonds permit bonds, small business administration bonds, bail bonds, and supersedeas bond, said bonding agent using said bonding agent's computer to select said bond;

transmitting information obtained by said agent electronically to one or more said surety companies over said computer network, said bonding agent using said bonding agent's computer to transmit said information;

requesting approval of the bond from at least one of said surety companies over said computer network, said bonding agent using said bonding agent's computer to request said approval;

upon approval of the bond by the surety company over said computer network, providing the applicant with a code for accessing the bond over said computer network;

providing an owner/obligee, over said computer network, with said code at the bid letting, said owner/obligee using said owner's/obligee's computer to receive said code;

permitting said obligee to log onto said computer network, through the use of said code to review the bond issued by said surety company, said owner/obligee using said owner's/obligee's computer to logon to said computer network.

41. A method of obtaining a surety bond over a computer network, said computer network comprising, at least an agent computer, a surety computer, and a third party computer, said method comprising:

an applicant for a bond accessing website of a bonding agency through a login and a password;

said contractor entering a bond request, over said computer network to said bonding agent;

said agent providing one or more sureties with a name of a contractor, said contractor's address, the identity of an owner/obligee for whom the bond is required, an identification of the bond form required, an estimated contract price, an amount of the bid security, a contract number or IFB number, and a description of the job, over said computer network;

said agent selecting a surety for issuing a bond from one or more surety companies that have pre-approved an agent applying for said bond, said bonding agent using said bonding agent's computer to select said surety;

said agent selecting a bond from the group consisting, of bid bonds, contract bonds, court bonds, subdivision bonds, performance bonds, customs bonds, notary bonds, liquor license bonds, license bonds permit bonds, small business administration bonds, bail bonds, and supersede as bonds, over said computer network, said bonding agent using said bonding agent's computer to select said bond;

said agent transmitting the information obtained from said applicant electronically to said surety company, over said computer network, said bonding agent using said bonding agent's computer to transmit said information;

requesting approval of the bond from said surety company, over said computer network, said bonding agent using said bonding agent's computer to request said approval;

upon approval of the bond by the surety company providing the applicant with a code for accessing the bond, over said computer network;

providing an owner/obligee with said code at the bid letting, over said computer network, said owner/obligee using said owner's/obligee's computer to receive said code;

permitting said obligee to log onto said computer network through the use of said code to review the bond, said owner/obligee using said owner's/obligee's computer to logon to said computer network.

\* \* \* \* \*